(12) United States Patent
Teranisi

(10) Patent No.: US 7,321,658 B2
(45) Date of Patent: Jan. 22, 2008

(54) PADDING APPLICATION METHOD ENSURING SECURITY OF CRYPTOSYSTEM AND ENCRYPTOR/DECRYPTOR

(75) Inventor: Isamu Teranisi, Tokyo (JP)

(73) Assignee: NEC Corporation, Tokyo (JP)

( * ) Notice: Subject to any disclaimer, the term of this patent is extended or adjusted under 35 U.S.C. 154(b) by 35 days.

(21) Appl. No.: 10/561,216

(22) PCT Filed: Mar. 23, 2005

(86) PCT No.: PCT/JP2005/005287

§ 371 (c)(1),
(2), (4) Date: Jan. 12, 2006

(87) PCT Pub. No.: WO2005/098756

PCT Pub. Date: Oct. 20, 2005

(65) Prior Publication Data

US 2006/0171531 A1 Aug. 3, 2006

(30) Foreign Application Priority Data

Mar. 31, 2004 (JP) ............................. 2004-102399

(51) Int. Cl.
*H04L 9/28* (2006.01)
(52) U.S. Cl. ............................. 380/28; 380/30; 380/37; 380/42; 708/250
(58) Field of Classification Search .................. 380/28, 380/30, 37, 42
See application file for complete search history.

(56) References Cited

U.S. PATENT DOCUMENTS 5,068,895 A * 11/1991 Shimada ..................... 380/28

(Continued)

FOREIGN PATENT DOCUMENTS

AU 4582897 A 3/1998

(Continued)

OTHER PUBLICATIONS

M. Bellare and P. Rogaway, "Optimal Asymmetric Encryption-How to Encrypt with RSA", Advances in Cryptography- Encrypt 94 Proceedings, Lecture Noted in Computer Science vol. 950, A. De Santis ed., Springer-Verlag, 1994.*

(Continued)

*Primary Examiner*—Kim Vu
*Assistant Examiner*—Nirav Patel
(74) *Attorney, Agent, or Firm*—Sughrue Mion, Pllc.

(57) ABSTRACT

An encryptor/decryptor capable of achieving secure cryptographic communication by applying appropriate padding to a cryptosystem such as NTRU cryptosystems.

When an n-bit plaintext M is received, the OAEP+ padding is applied thereto. According to a conversion rule or a conversion function A that satisfies the conditions as described below, two bit strings m and r are obtained from the result of the OAEP+ padding. The conversion function A is a map to map a bit string consisting of k bits or less to the element of $L_m \times L_r$, where $L_m$ is the scope of m and $L_r$ is the scope of r. The conversion function A should satisfy the following conditions: A is injective; A and the inverse map thereof can be computed by a polynomial time; and if an encryption function is denoted by E(m,r), a map E: A(X) →$L_e$ is a one-way function, where X is the scope of (m,r) and $L_e$ is the space of the entire ciphertext. After a bit string is divided into the two bit strings m and r, e=E'(m) is computed to be encrypted. Thus, a ciphertext e is transmitted to a receiver.

20 Claims, 10 Drawing Sheets

U.S. PATENT DOCUMENTS

| | | | |
|---|---|---|---|
| 5,345,507 A * | 9/1994 | Herzberg et al. | 380/28 |
| 6,081,597 A | 6/2000 | Hoffstein et al. | |
| 7,164,765 B2 * | 1/2007 | Nishioka et al. | 380/30 |
| 2002/0199001 A1 * | 12/2002 | Wenocur et al. | 709/227 |
| 2004/0078576 A1 * | 4/2004 | Geitinger | 713/181 |
| 2004/0151307 A1 * | 8/2004 | Wang et al. | 380/30 |

FOREIGN PATENT DOCUMENTS

| | | |
|---|---|---|
| CA | 2 263 588 A | 1/2005 |
| CN | 1232588 A | 10/1999 |
| JP | 2000-516733 A | 12/2000 |
| WO | WO 98/08323 A1 | 2/1998 |

OTHER PUBLICATIONS

Victor Shoup, "OAEP Reconsidered (Extended Abstract)," LNCS, vol. 2139, 2001, pp. 239 to 259.

Phong Q. Nguyen, et al. "Analysis and Improvements of NTRU Encryption Paddings," LNCS, vol. 2442, 2002, pp. 210 to 225.

John A. Proos, "Imperfect Decryption and an Attack on the NTRU Encryption Scheme," University of Waterloo, Jan. 7, 2003, pp. 1 to 28.

Eliane Jaulmes, et al. "A Chosen-Ciphertext Attack Against NTRU," Crypto 2000 Springer Lecture Notes in Computer Sciences, 2000, pp. 20 to 35.

Jeffrey Hoffstein, et al. "Protecting NTRU Against Chosen Ciphertext and Reaction Attacks," NTRU Cryptosystems Technical Report, Report #016, Version 1, Jun. 9, 2000, pp. 1 to 6.

Jeffrey Hoffstein, et al. "Optimizations for NTRU," NTRU Cryptosystems, Inc., pp. 1 to 12.

Joseph H. Silverman, "Plaintext Awareness and the NTRU PKCS," NTRU Cryptosystems Technical Report, Report #007, Version 2, Jun. 2000, pp. 1 to 7.

Don Coppersmith, et al. "Lattice Attacks on NTRU," Eurocrypt '97 Springer Lecture Notes in Computer Sciences, 1997, pp. 52 to 61.

Jeffrey Hoffstein, et al. "NTRU: A Ring-Based Public Key Cryptosystem".

* cited by examiner

FIG. 1
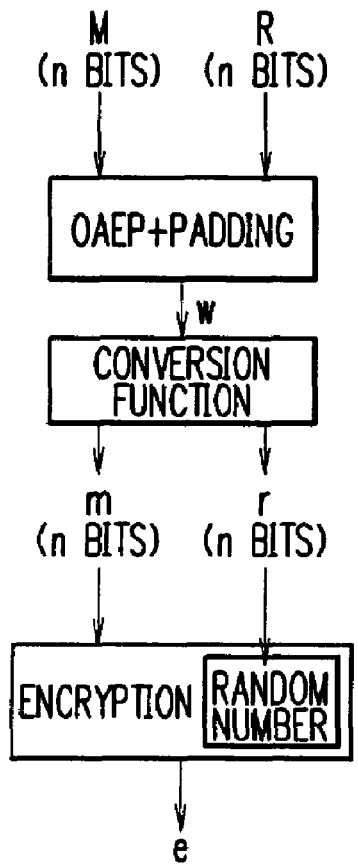
(A)
(PRESENT INVENTION)
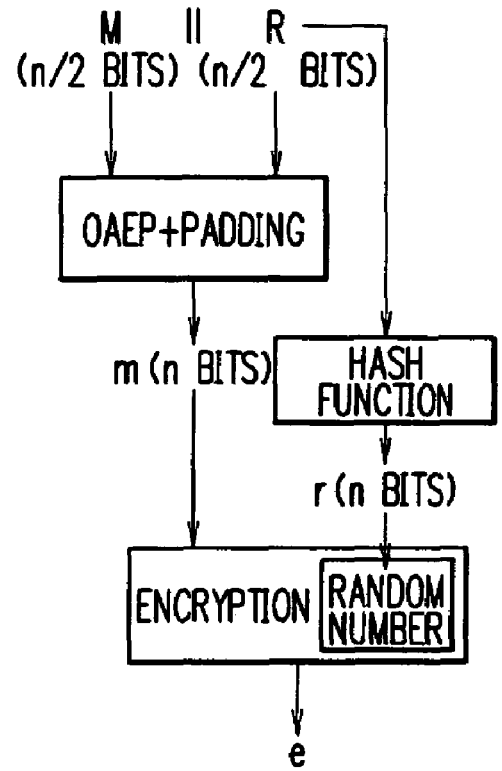
(B)
(PRIOR ART)

F I G. 6
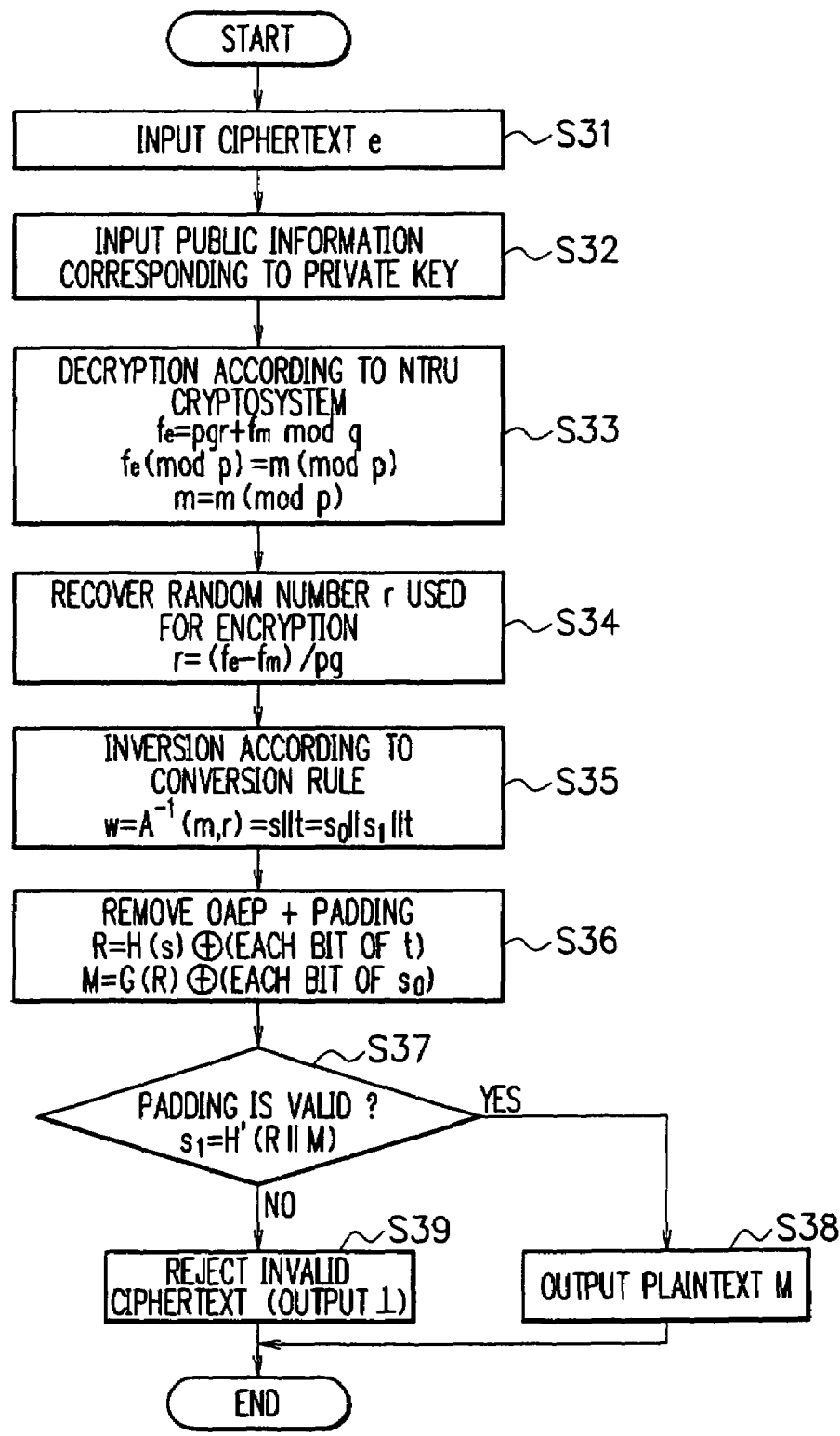

PADDING APPLICATION METHOD ENSURING SECURITY OF CRYPTOSYSTEM AND ENCRYPTOR/DECRYPTOR

TECHNICAL FIELD

The present invention relates to an encryption/decryption system, and more particularly, to a padding application method and an encryptor/decryptor for ensuring the security against chosen ciphertext attacks.

BACKGROUND ART

The social application of cryptographic technology has been vigorously promoted to ensure the security of communication, and effective cryptographic computation is required more than ever. In such trend, the NTRU cryptosystem proposed in "NTRU: A Ring-Based Public Key Cryptosystem" (Non Patent Document 1) written by Jeffery Hoffstein, Jill Pipher and Joseph H. Silverman attracts attention as a high-speed encryption/decryption computation system with lower memory requirement as compared to the conventional RSA or ElGamal cryptosystem.

(NTRU Cryptosystem)

The NTRU cryptosystem is a public key cryptosystem as follows.

First, a key is created in the following manner. Three integers p, q and N are used as public and domain parameters. Besides, the ring $R=Z[X]/(X^N-1)$ is used. Hereinafter, L(a, b) indicates the total set (a subset of R) of an element $u \in R$ having a coefficients equal to 1, b coefficients equal to −1 and the rest 0 for each degree thereof. Parameters df, dg and d are chosen to set $L_f=L(df, df+1)$, $L_g=L(dg, dg+1)$, and $L_\varphi=L(d, d)$. Two polynomials $f \in L_f$ and $g \in L_g$ are randomly selected such that $h=f^{-1} g \bmod q$. Then, the private or secret key is the polynomial f, g, while the public key is the polynomial h.

When the keys have been created, an element m of the subset $L_m$ of R, $m \in L_m$, is encrypted. A polynomial $r \in L_r$ is randomly selected to compute $e=phr+m \bmod q$. Thus, e is output as a ciphertext.

In order to decrypt the ciphertext e to the original plaintext or cleartext m, $fe=pgr+fm \bmod q$ is computed. Since f, g, r, and m are elements of the subsets $L_f$, $L_g$, $L_r$, and $L_m$, respectively, $fe=pgr+fm$. Accordingly, $fe(\bmod p)=m(\bmod p)$ can be computed. Also, since the m is an element of the subset $L_m$, $m=m \pmod p$, and therefore, m can be retrieved.

However, as pointed out in "Lattice Attacks on NTRU", Eurocrypt '97 Springer Lecture Notes in Computer Science, 1997 (Non Patent Document 2) written by Don Coppersmith and Adi Shamir, there are known a various sorts of attacks against the NTRU cryptosystem. As such, some schemes have been proposed to prevent the attacks, in which some kind of padding is applied to a plaintext before NTRU encryption.

(OAEP+Padding System)

As a padding scheme to secure cryptosystems, for example, the one called OAEP+ is known. The OAEP+ padding was proposed in "OAEP Reconsidered", Journal of Cryptology 15 (4) (Non Patent Document 3) written by Victor Shoup. The OAEP+ padding is a padding scheme as follows.

First, integers k, $k_0$, and $k_1$ are selected as parameters so as to satisfy $k_0, +k_1 \leq k \leq L$, where L is the number of elements in the plaintext space.

Then, $n=k-k_0-k_1$ is set.

Let G denote a hash function to map a k-bit string to an n-bit string.

Let H' be a hash function to map an $n+k_0$-bit string to a $k_1$-bit string.

Let H be a hash function to map an $n+k_1$-bit string to a $k_0$-bit string.

Upon receipt of an n-bit plaintext M, a padder randomly selects a $k_0$-bit string R. Subsequently, the padder computes the exclusive OR $s^0$ of G(R) and each bit of M as well as $s^1=H'(R\|M)$ such that $s=s^0\|s^1$. Incidentally, the symbol "$\|$" is used to denote concatenation of bit strings. If t denotes the exclusive OR of H(s) and each bit of R, then $w=s\|t$. This w is called "OAEP+ padding using the random number R of the plaintext M". The OAEP+ padding w thus obtained is encrypted (by a cryptosystem not using random numbers), and a ciphertext e is transmitted to a receiver.

The receiver decrypts the ciphertext e to obtain w. After decrypting w, a depadder recovers the plaintext M in the following manner. First, through the use of $w=s\|t=s_0\|s_1\|t$, the depadder recovers $s_0$, $s_1$ and t. Then, the depadder computes the exclusive OR of H(s) and each bit of t to recover R. Also, the depadder computes the exclusive OR of G(R) and each bit of $s_0$ to recover M. If $s_1=H'(R\|M)$ is satisfied, the depadder outputs M. Otherwise, the depadder rejects the ciphertext e as invalid and outputs $\perp$.

The OAEP+ padding, however, is a padding scheme proposed to be applied to cryptosystems not using random numbers the computation of an encryption function. Consequently, if the OAEP+ padding is applied to a cryptosystem using random numbers such as NTRU, security is not always ensured. In addition, when the OAEP+ padding is applied to a cryptosystem using random numbers such as NTRU, not a unique but various application methods may by utilized. Therefore, there is also a problem in that it is not possible to immediately distinguish between secure and insecure padding application methods.

As just described, the OAEP+ padding ensures the security only for cryptosystems not using random numbers. Besides, there have been some OAEP+ or OAEP+ like padding schemes introduced for use with the NTRU cryptosystem using random numbers to ensure the security. Reference may be had to, for example, the following documents:

Joseph H. Silverman, "Plaintext Awareness and the NTRU PKCS", Technical Report #7 version 2, NTRU Cryptosystems, 1998 (Non Patent Document 4)

Jeffery Hoffstein and Joseph H. Silverman, "Optimizations for NTRU", Public-key Cryptography and Computational Number Theory (Non Patent Document 5)

Jeffery Hoffstein and Joseph H. Silverman, "Protecting NTRU Against Chosen Ciphertext and Reaction Attacks", Technical Report #16 version 1, NTRU Cryptosystems, 2000 (Non Patent Document 6)

Phong Q. Nguyen and David Pointcheval, "Analysis and Improvements of NTRU Encryption Paddings", Crypto 2002 Springer Lecture Notes in Computer Science, 2002 (Non Patent Document 7)

With all of these padding schemes, attacks against the NTRU cryptosystem has succeeded. The padded version of the NTRU cryptosystem described in Non Patent Document 4 is broken by the algorithm proposed in "A Chosen-Ciphertext Attack against NTRU", Crypto 2000 Springer Lecture Notes in Computer Science, 2000 (Non Patent Document 8) written by Eliane Jaulmes and Antoine Joux.

Further, the padded version of the NTRU cryptosystem described in Non Patent Documents 5 and 6 is broken by the algorithm proposed in Non Patent Document 7. The padding scheme proposed in Non Patent Document 7 does not protect against attacks presented in "Imperfect Decryption and an Attack on the NTRU Encryption Scheme" (Non Patent Document 9) written by John A. Proos.

There have been proposed padding schemes other than the OAEP+ padding scheme aimed at ensuring the security of cryptosystems using random numbers such as NTRU. However, each padding scheme has a different disadvantage, and the OAEP+ padding is still significant to ensure the security of cryptosystems.

Non Patent Document 1: Jeffery Hoffstein, Jill Pipher and Joseph H. Silverman, "NTRU: A Ring-Based Public Key Cryptosystem"

Non Patent Document 2: "Lattice Attacks on NTRU", Eurocrypt '97 Springer Lecture Notes in Computer Sciences, 1997

Non Patent Document 3: "OAEP Reconsidered", Journal of Cryptology 15 (4)

Non Patent Document 4: "Plaintext Awareness and the NTRU PKCS", Technical Report #7 version 2, NTRU Cryptosystems, 1998

Non Patent Document 5: Jeffery Hoffstein and Joseph H. Silverman, "Optimizations for NTRU", Public-key Cryptography and Computational Number Theory Non Patent Document 6: Protecting NTRU Against Chosen Ciphertext and Reaction Attacks", Technical Report #16 version 1, NTRU Cryptosystems, 2000

Non Patent Document 7: "Analysis and Improvements of NTRU Encryption Paddings", Crypto 2002 Springer Lecture Notes in Computer Sciences, 2002

Non Patent Document 8: "A Chosen-Ciphertext Attack against NTRU", Crypto 2000 Springer Lecture Notes in Computer Sciences, 2000

Non Patent Document 9: John A. Proos, "Imperfect Decryption and an Attack on the NTRU Encryption Scheme"

DISCLOSURE OF THE INVENTION

Problems that the Invention is to Solve

As is described above, with the conventional padded version of NTRU cryptosystems, secure cryptographic communication cannot be performed.

It is therefore an object of the present invention to provide a padding application method and an encryptor/decryptor for achieving secure cryptographic communication by applying appropriate padding to a cryptosystem such as NTRU.

Means of Solving the Problems

The present inventor noted that random numbers used for encryption can be retrieved in NTRU cryptosystems, and invented a new padding application method capable of ensuring the security of cryptographic communication.

(Reason for the Realization)

The reason for the realization of the present invention will be schematically described below. As typical cryptosystems using random numbers, the ElGamal and Paillier cryptosystems are known. In these cryptosystems, a receiver of a ciphertext can recover the original plaintext, but cannot recover the random number. As such, the plaintext and random number need to be handled as completely different data.

Additionally, in many cryptosystems such as ElGamal and Paillier, the encryption function is a stochastic function, and the domain of the encryption function corresponds to the space of the entire plaintext M, while the range thereof corresponds to the space of the entire ciphertext. Meanwhile, the decryption function is a nonstochastic function, and the domain of the decryption function corresponds to the space of the entire ciphertext, while the range thereof corresponds to the space of the entire plaintext. Again, in these cryptosystems, a random number used for encryption cannot be recovered.

On the other hand, the NTRU cryptosystem is characterized in that a random number r can be obtained by r=(fe−fm)/pg after the recovery of a plaintext m. Consequently, in the NTRU cryptosystem, the plaintext is not necessarily distinguished from the random number differently from such cryptosystems as ElGamal and Paillier.

Accordingly, in the NTRU cryptosystem, it can be considered that:

the encryption function is a function not based on a random number, and the domain of the encryption function corresponds to the space of the entire concatenation of a plaintext M with a random number R, while the range thereof corresponds to the space of the entire ciphertext; and that the decryption function is also a function not based on a random number, and the domain of the decryption function corresponds to the space of the entire ciphertext, while the range thereof corresponds to the space of the entire concatenation of the plaintext M with the random number R.

As has already been described, the OAEP+ padding ensures the security if an encryption function is not based on a random number. Therefore, the OAEP+ padding with security assurance is applicable to the data structure of the NTRU cryptosystem in which a plaintext is not distinguished from a random number.

SUMMARY OF THE INVENTION

Based on these understandings, the present invention was made. That is, in accordance with the present invention, there is provided a padding application method to be applied to a cryptosystem $E^r(m)$ that allows a ciphertext receiver to recover the value of a random number used by a ciphertext creator to create a ciphertext. With the application of the present invention to such a cryptosystem, security is ensured.

In accordance with an aspect of the present invention, there is provided a padding application method for applying a padding scheme that ensures the security of cryptosystems not using random numbers to cryptosystems in which the value of a random number used to create a ciphertext can be recovered at the receiving end. The padding application method comprises the steps of converting input information into a bit string with a prescribed length or less according to the padding scheme, converting the bit string into a first bit string and a second bit string based on a prescribed conversion rule, and supplying an encryption function with the first bit string as data input and the second bit string as random number input. The prescribed conversion rule is a map to map the bit string having a prescribed length or less to the element of the direct product of the set of the first bit strings and the set of the second bit strings, and satisfies the following conditions: the map is injective; the map and inverse map thereof can be computed by a polynomial time; and the encryption function whose domain is the direct product is a one-way function.

In accordance with another aspect of the present invention, the conversion rule is a rule to divide the bit string into two parts in such a manner as to set the first half of the bit string as the first bit string and the second half of the bit string as the second bit string.

In accordance with yet another aspect of the present invention, the OAEP+ padding is employed as the padding scheme, and the NTRU cryptosystem is employed as the cryptosystem using random numbers.

FIG. 1 (A) is a conceptual block diagram showing an encryptor adopting a padding application method according to the present invention. FIG. 1 (B) is a conceptual block diagram showing a conventional encryptor adopting an OAEP-based padding scheme. In FIGS. 1 (A) and 1 (B), the most common parameters are employed; $n=k_0=k_1$, and r is the bit number of m.

Referring to FIG. 1 (A), the padding application method of the present invention will be described. First, parameters are selected in the same manner as in the OAEP+ padding. More specifically, integers k, $k_0$, and $k_1$ are selected as parameters so as to satisfy $k_0, +k_1<k<L$, where L is the number of elements in the plaintext space. Then, $n=k-k_0-k_1$ is set. Also, let G denote a hash function to map a k-bit string to an n-bit string, let H' be a hash function to map an $n+k_0$-bit string to a $k_1$-bit string, and let H be a hash function to map an $n+k_1$-bit string to a $k_0$-bit string.

When an n-bit plaintext M is received, the OAEP+ padding is applied thereto. That is, a $k_0$-bit string R is randomly selected. Subsequently, the exclusive OR $s^0$ of G(R) and each bit of M as well as $s^1=H'(R\|M)$ are computed such that $s=s^0\|s^1$. Incidentally, the symbol "$\|$" is used to denote concatenation of bit strings. If t denotes the exclusive OR of H(s) and each bit of R, then $w=s\|t$.

Next, according to a rule A (hereinafter referred to as a conversion function A) that satisfies the conditions as will be presently described, two bit strings m and r are generated from w. The conversion function A is a map to map a bit string consisting of k bits or less to the element of $L_m \times L_r$, where $L_m$ is the scope of m and $L_r$ is the scope of r. The conversion function A should satisfy the following conditions:

(1) A is infective;

(2) A and the inverse map thereof can be computed by a polynomial time; and (3) if an encryption function is denoted by E(m, r), a map E: $A(X) \to L_e$ is a one-way function (where X is the scope of (m, r) and $L_e$ is the space of the entire ciphertext).

In the case of the NTRU cryptosystem, for example, a bit string w is divided into a first half bit string and a second half bit string, and they are set as m and r, respectively. When the bit string w has been converted into two bit strings, $e=E^r(m)$ is computed to be encrypted. Thus, a ciphertext e is transmitted to a receiver.

Having received the ciphertext e, the receiver decrypts it to obtain m. As is described above, according to a characteristic of $E^r(m)$, r can be recovered. Hence, r is recovered. Subsequently, w is recovered based on $w=m\|r$. After the recovery of w, the plaintext M is recovered in the same manner as in the OAEP+ padding. More specifically, through the use of $w=s\|t=s_0\|s_1\|t$, $s_0$, $s_1$ and t are recovered. Then, the exclusive OR of H(s) and each bit of t is computed to recover R. Also, the exclusive OR of G(R) and each bit of $s_0$ is computed to recover M. If $s_1=H'(R\|M)$ is satisfied, M is output. Otherwise, the ciphertext e is rejected as invalid and $\perp$ is output.

EFFECT OF THE INVENTION

In the following, on the basis of comparison between the present invention and the conventional techniques, the effect of the present invention will be described. As can be seen in FIG. 1 (B) showing an example of a conventional encryptor, in the aforementioned techniques proposed in Non Patent Documents 4 to 7, only m is obtained from a plaintext M according to the OAEP+(or another) padding, and r is obtained in some way or other. Such padding schemes can be applied to cryptosystems such as ElGamal and Paillier in which a plaintext only but no random number can be recovered at the receiving end. However, these padding schemes are ad hoc, and cannot ensure the security. Especially, in the case of NTRU, perfect decryption is possible.

On the other hand, in accordance with the present invention, a padding scheme is applied to cryptosystems such as NTRU in which the receiver of a ciphertext can recover a random number as well as a plaintext. Differently from the conventional techniques, both m and r are obtained from a plaintext M according to the OAEP+ padding and a prescribed conversion rule (function A). In addition, differently from the conventional techniques, when applied to cryptosystems such as NTRU in which the receiver of a ciphertext can recover a random number as well as a plaintext, the padding scheme can ensure the security.

In other words, in accordance with the present invention, secure cryptographic communication can be performed making use of the NTRU cryptosystem: the high-speed encryption/decryption computation system with lower memory requirement.

BEST MODE FOR CARRYING OUT THE INVENTION

FIG. 2 is a block diagram showing an example of a cryptographic communication system including an encryptor/decryptor according to the present invention. In FIG. 2, cryptographic communication is performed between communication terminals via a network.

A sending communication terminal comprises a program control processor 10, a random number generator 11, a program memory 12, a memory 13 and a transmitter/receiver 14. As will be described later, the sending communication terminal executes programs stored in the program memory 12, necessary for such operations as OAEP+ conversion or transformation, conversion based on a conversion function A and NTRU encryption, to encrypt a plaintext or cleartext. Thereby, the sending communication terminal transmits the ciphertext from the transmitter/receiver 14 to a destination communication terminal via a network. Incidentally, the memory 13 stores information necessary for encryption such as public information and a private or secret key.

Similarly, a receiving communication terminal comprises a program control processor 20, a random number generator 21, a program memory 22, a memory 23 and a transmitter/receiver 24. As will be described later, the receiving communication terminal executes programs stored in the program memory 22, necessary for such operations as NTRU decryption, random number recovery, inversion or inverse transformation and OAEP+ inversion or inverse OAEP+ transformation, to decrypt a ciphertext received through the transmitter/receiver 24. Thereby, the receiving communication terminal retrieves the plaintext. Incidentally, the memory 23 stores information necessary for decryption such as public information and a private key.

1. First Embodiment

FIG. 3 is a functional block diagram showing the construction of an encryptor/decryptor according to the first embodiment of the present invention. The encryptor/decryptor of this embodiment comprises an encryptor 100 for encrypting a plaintext, a decryptor 200 for decrypting a ciphertext to a plaintext, a key generator 300, a public information storage 301 for storing public information necessary for encryption/decryption generated by the key generator 300, and a private key storage 302 for storing private key information necessary for decryption.

A plaintext is fed to the encryptor 100 through a plaintext input unit 101. The encryptor 100 includes an OAEP+ converter 102, a conversion function A-based converter 103 and an NTRU encryption section 104. A ciphertext created by the encryptor 100 is output to, for example, a receiving terminal through a ciphertext output unit 105.

A ciphertext is fed to the decryptor 200 through a ciphertext input unit 201. The decryptor 200 includes an NTRU decryption section 202, a random number recovery section 203, a conversion function A-based inverter 204 and an OAEP+ inverter 205. A plaintext retrieved by the decryptor 200 is output through a plaintext output unit 206.

1.1) Key Creation

First, the key creation process will be described.

FIG. 4 is a flowchart showing the key creation process according to the first embodiment. The key generator 300 selects integers p, q and N which are used as public and domain parameters. As in the NTRU cryptosystem described above, the ring $R=Z[X]/(X^N-1)$ is used. L(a, b) indicates the total set (a subset of R) of an element $u \in R$ having a coefficients equal to 1, b coefficients equal to −1 and the rest 0 for each degree thereof. Additionally, the subsets of R are denoted by $L_f$, $L_g$, $L_r$, and $L_m$ (step S11).

After that, as previously described for the OAEP+ padding scheme, the key generator 300 selects integers k, $k_0$, and $k_1$ as parameters such that they satisfy $k_0 + k_1 \leq k \leq L$, where L is the number of elements in $L_m \times L_r$. Then, $n = k - k_0 - k_1$ is set.

Let G denote a hash function to map a k-bit string to an n-bit string.

Let H' be a hash function to map an $n+k_0$-bit string to a $k_1$-bit string.

Let H be a hash function to map an $n+k_1$-bit string to a $k_0$-bit string (step S12).

In addition, the key generator 300 determines a conversion function A (step S13). The conversion function A is a map to map a bit string consisting of k bits or less to the element of $L_m \times L_r$. The conversion function A should satisfy the following conditions:

(1) A is injective;
(2) A and the inverse map thereof can be computed by a polynomial time; and
(3) if an encryption function is denoted by E(m, r), a map E: A(X)→$L_e$ is a one-way function (where X is the scope of (m, r) and $L_e$ is the space of the entire ciphertext).

The key generator 300 creates a key in the same manner as in NTRU. More specifically, two polynomials $f \in L_f$ and $g \in L_g$ are randomly selected such that $h = f^1 g \mod q$. Then, the private key is the polynomial f, g, while the public key is the polynomial h (step S14). The key generator 300 secretly stores the private key f, g in the private key storage 302 (step S15), and also stores the NTRU public key, the hash functions and the conversion function (p, q, N, $L_f$, $L_g$, $L_r$, $L_m$, k, $k_0$, $k_1$, G, H', H, A, h) in the public information storage 301 to open them to public (step S16).

1.2) Encryption

Next, the encryption process will be described.

FIG. 5 is a flowchart showing the encryption process according to the first embodiment. Referring to FIG. 5, the encryptor 100 receives an n-bit plaintext M through the plaintext input unit 101 (step S21). Then, the encryptor 100 receives public information p, q, N, $L_f$, $L_g$, $L_r$, $L_m$, k, $k_0$, $k_1$, G, H', H, A, and h from the public information storage 301 (step S22).

Subsequently, the encryptor 100 randomly selects a $k_0$-bit string R (step S23). The OAEP+ converter 102 computes the exclusive OR $s^0$ of G(R) and each bit of M as well as $s^1 = H'(R \| M)$ such that $s = s^0 \| s^1$. Further, t is set as the exclusive OR of H(s) and each bit of R to have $w = s \| t$. Thereby, the OAEP+ converter 102 applies the OAEP+ padding to the plaintext (step S24).

According to (m, r)=A(w), the converter 103 converts a bit string w into two bit strings m and r using the conversion function A (step S25). Here, w is equally divided into a first half bit string m and a second half bit string r. After that, the NTRU encryption section 104 computes $e = phr + m \mod q$ to perform NTRU encryption (step S26). Thus, the NTRU encryption section 104 creates a ciphertext and outputs it through the ciphertext output unit 105 (step S27).

1.3) Decryption

Lastly, the decryption process will be described.

FIG. 6 is a flowchart showing the decryption process according to the first embodiment. Referring to FIG. 6, the decryptor 200 receives a ciphertext e through the ciphertext input unit 201 (step S31). Then, the decryptor 200 receives a private key corresponding to the ciphertext from the private key storage 302, and also receives public information corresponding to the private key from the public information storage 301 (step S32).

The NTRU decryption section 202 decrypts the ciphertext e using the private key and the public information in the same manner as in NTRU. More specifically, the NTRU decryption section 202 computes $fe = pgr + fm \mod q$. Since f, g, r, and m are elements of the subsets $L_f$, $L_g$, $L_r$, and $L_m$, respectively, fe=pgr+fm. Accordingly, the NTRU decryption section 202 can computes fe(mod p)=m(mod p). Also, since the m is an element of the subset Lm, m=m(mod p), and therefore, the NTRU decryption section 202 can retrieve m (step S33).

In addition, based on fe=pgr+fm, the random number recovery section 203 computes r=(fe−fm)/pg to recover a random number r (step S34).

Based on $A^{-1}(m, r)$, the inverter 204 recovers $w = s \| t = s_0 \| s_1 \| t$ using the inverse of the conversion function A (step S35). Subsequently, the OAEP+ inverter 205 computes the exclusive OR of H(s) and each bit of t to recover R. Also, the OAEP+ inverter 205 computes the exclusive OR of G(R) and each bit of $s_0$ to recover M (step S36).

Thereafter, the OAEP+ inverter 205 verifies the validity of the padding according to whether $s_1 = H'(R \| M)$ is satisfied or not (step S37). If the padding is valid, the OAEP+ inverter 205 outputs the plaintext M (step S38). Otherwise, the OAEP+ inverter 205 rejects the ciphertext e as invalid and outputs ⊥ (step S39).

2. Second Embodiment

FIG. 7 is a functional block diagram showing the construction of an encryptor/decryptor according to the second embodiment of the present invention. The encryptor/decryptor of this embodiment comprises an encryptor 400 for encrypting a plaintext, a decryptor 500 for decrypting a ciphertext to a plaintext, a key generator 300, a public information storage 301 for storing public information necessary for encryption/decryption generated by the key generator 300, and a private key storage 302 for storing private key information necessary for decryption.

A plaintext is fed to the encryptor 400 through a plaintext input unit 101. The encryptor 400 includes a random number generator 401, a private key encryption section 402, an OAEP+ converter 403, a conversion function A-based converter 404 and an NTRU encryption section 405. A ciphertext created by the encryptor 400 is output to, for example, a receiving terminal through a ciphertext output unit 105.

A ciphertext is fed to the decryptor 500 through a ciphertext input unit 201. The decryptor 500 includes an NTRU decryption section 501, a random number recovery section 502, a conversion function A-based inverter 503, an OAEP+ inverter 504 and a private key decryption section 505. A plaintext retrieved by the decryptor 500 is output through a plaintext output section 206.

2.1) Key Creation

First, the key creation process will be described.

FIG. 8 is a flowchart showing the key creation process according to the second embodiment. The key generator 300 selects integers p, q and N which are used as public and domain parameters. As in the NTRU cryptosystem described above, the ring $R=Z[X]/(X^N-1)$ is used. L(a, b) indicates the total set (a subset of R) of an element $u \in R$ having a coefficients equal to 1, b coefficients equal to −1 and the rest 0 for each degree thereof. Additionally, the subsets of R are denoted by $L_f$, $L_g$, $L_r$, and $L_m$ (step S41).

After that, as previously described for the OAEP+ padding scheme, the key generator 300 selects integers k, $k_0$, and $k_1$ as parameters such that they satisfy $k_0, +k_1 \leq k \leq L$ where L is the number of elements in $L_m \times L_r$. Then, $n=k-k_0-k_1$, is set.

Let G denote a hash function to map a k-bit string to an n-bit string.

Let H' be a hash function to map an $n+k_0$-bit string to a $k_1$-bit string.

Let H be a hash function to map an $n+k_1$-bit string to a $k_0$-bit string (step S42).

In addition, the key generator 300 determines a conversion function A (step S43). As previously described, the conversion function A is a map to map a bit string consisting of k bits or less to the element of $L_m \times L_r$. The conversion function A should satisfy the following conditions:

(1) A is injective;

(2) A and the inverse map thereof can be computed by a polynomial time; and (3) if an encryption function is denoted by E(m, r), a map E: $A(X) \rightarrow L_e$ is a one-way function (where X is the scope of (m, r) and $L_e$ is the space of the entire ciphertext).

The key generator 300 creates a key in the same manner as in NTRU. More specifically, two polynomials $f \in L_f$ and $g \in L_g$ are randomly selected such that $h=f^{-1} g$ mod q. Then, the private key is the polynomial f, g, while the public key is the polynomial h. The key generator 300 secretly stores the private key f, g in the private key storage 302 (step S44).

Further, the key generator 300 determines a common or shared key cryptosystem E to be used (step S45), and stores the NTRU public key, the hash functions and the conversion function (p, q, N, $L_f$, $L_g$, $L_r$, $L_m$, k, $k_0$, $k_1$, G, H', H, A, h) in the public information storage 301 to open them to public (step S46).

2.2) Encryption

Next, the encryption process will be described.

FIG. 9 is a flowchart showing the encryption process according to the second embodiment. Referring to FIG. 9, the encryptor 400 receives an n-bit plaintext X through the plaintext input unit 101 (step S51). Then, the encryptor 400 receives public information p, q, N, $L_f$, $L_g$, $L_r$, $L_m$, k, $k_0$, $k_1$, G, H', H, A, and h from the public information storage 301 (step S52).

Subsequently, the private key encryption section 402 randomly selects a n-bit string M through the random number generator 401 (step S53). Then, the private key encryption section 402 computes $Y=E_M(X)$ to perform shared key encryption (step S54). Incidentally, $E_M(X)$ is obtained by encrypting the plaintext X according to the shared key cryptosystem E with M as a key.

After that, the encryptor 400 randomly selects a $k_0$-bit string R (step S55). The OAEP+ converter 403 computes the exclusive OR $s^0$ of G(R) and each bit of M as well as $s^1=H'(R||M)$ such that $s=s^0||s^1$. Further, t is set as the exclusive OR of H(s) and each bit of R to have $w=s||t$. Thereby, the OAEP+ converter 403 applies the OAEP+ adding to the plaintext (step S56).

According to (m, r)=A(w), the converter 404 converts a bit string w into two bit strings m and r using the conversion function A (step S57). Here, w is divided into two parts, and a first half bit string is set as m and a second half bit string is set as r. After that, the NTRU encryption section 405 computes e=phr+m mod q to perform NTRU encryption (step S58). Thus, the NTRU encryption section 405 creates a ciphertext e, and outputs it and a ciphertext Y obtained by the shared key encryption as a ciphertext (e, Y) through the ciphertext output unit 105 (step S59).

2.3) Decryption

Lastly, the decryption process will be described.

FIG. 10 is a flowchart showing decryption process according to the second embodiment. Referring to FIG. 10, the decryptor 500 receives a ciphertext (e, Y) through the ciphertext input unit 201 (step S61). Then, the decryptor 500 receives a private key corresponding to the ciphertext from the private key storage 302, and also receives public information corresponding to the private key from the public information storage 301 (step S62).

The NTRU decryption section 501 decrypts the ciphertext e using the private key and the public information in the same manner as in NTRU. More specifically, the NTRU decryption section 501 computes fe=pgr+fm mod q. Since f, g, r, and m are elements of the subsets $L_f$, $L_g$, $L_r$, and $L_m$, respectively, fe=pgr+fm. Accordingly, the NTRU decryption section 501 can computes fe(mod p)=m(mod p). Also, since the m is an element of the subset $L_m$, m=m(mod p), and therefore, the NTRU decryption section 501 can retrieve m (step S63).

In addition, based on fe=pgr+fm, the random number recovery section 502 computes r=(fe−fm)/pg to recover a random number r (step S64).

Based on $A^{-1}$(m, r), the inverter 503 recovers $w=s||t=s_0||s_1||t$ (step S65). Subsequently, the OAEP+ inverter 504 computes the exclusive OR of H(s) and each bit of t to recover R. Also, the OAEP+ inverter 504 computes the exclusive OR of G(R) and each bit of $s_0$ to recover M (step S66).

Thereafter, the OAEP+ inverter 504 verifies the validity of the padding according to whether $s_1=H'(R||M)$ is satisfied or not (step S67). If the padding is valid, the OAEP+ inverter 504 decrypts the shared key encrypted ciphertext with the shared key encryption key M to output the plaintext X (step S68). Otherwise, the OAEP+ inverter 504 rejects the ciphertext e as invalid and outputs ⊥ (step S69).

BRIEF DESCRIPTION OF THE DRAWINGS

FIG. 1 (A) is a conceptual block diagram showing an encryptor adopting a padding application method according to the present invention;

FIG. 1 (B) is a conceptual block diagram showing a conventional encryptor adopting an OAEP-based padding scheme.

FIG. 6 is a flowchart showing the decryption process according to the first embodiment.

DESCRIPTION OF CODES

Figure 2:
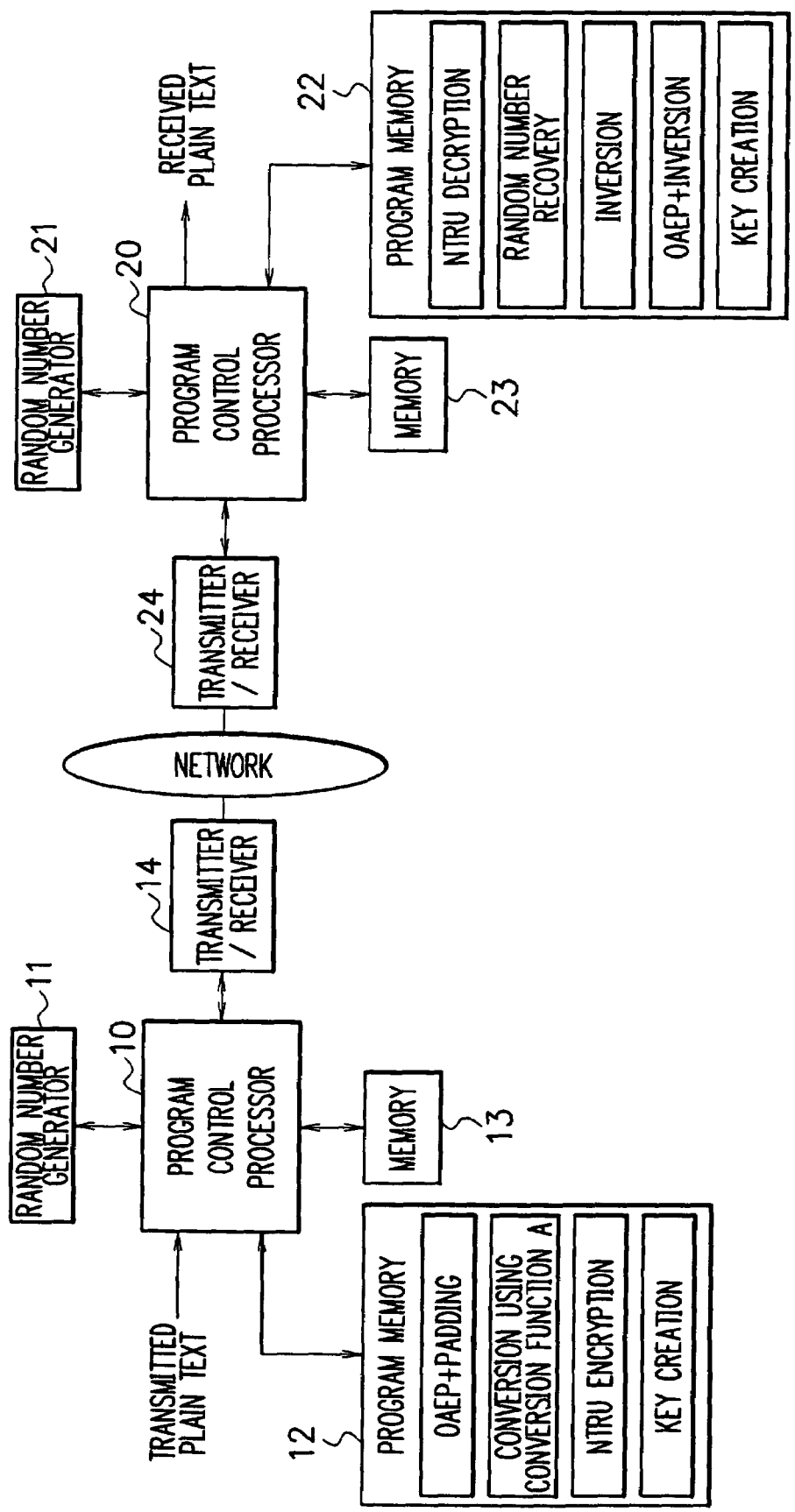
FIG. 2 is a block diagram showing an example of a cryptographic communication system including an encryptor/decryptor according to the present invention.
Figure 3:
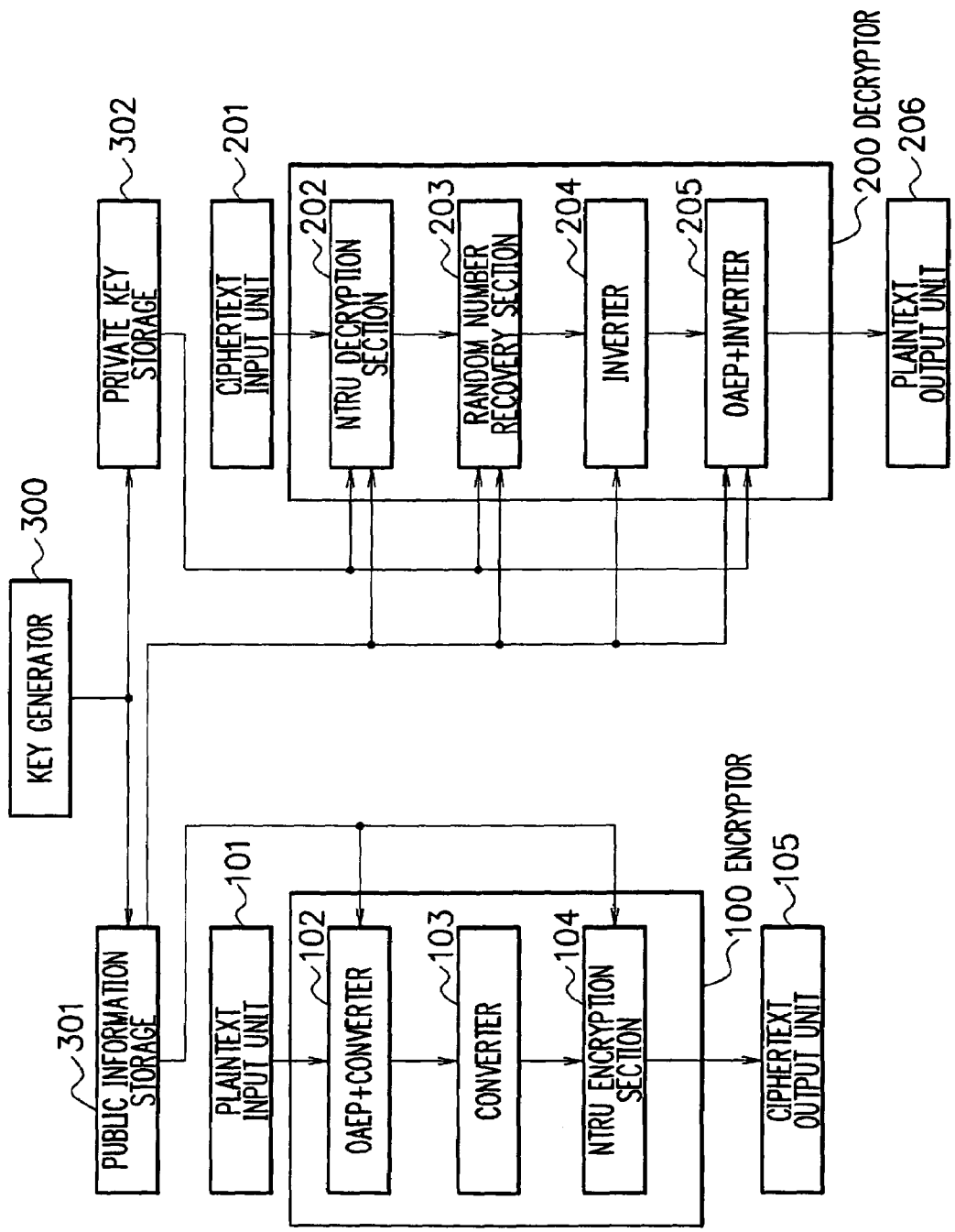
FIG. 3 is a functional block diagram showing the construction of an encryptor/decryptor according to the first embodiment of the present invention.
Figure 4:
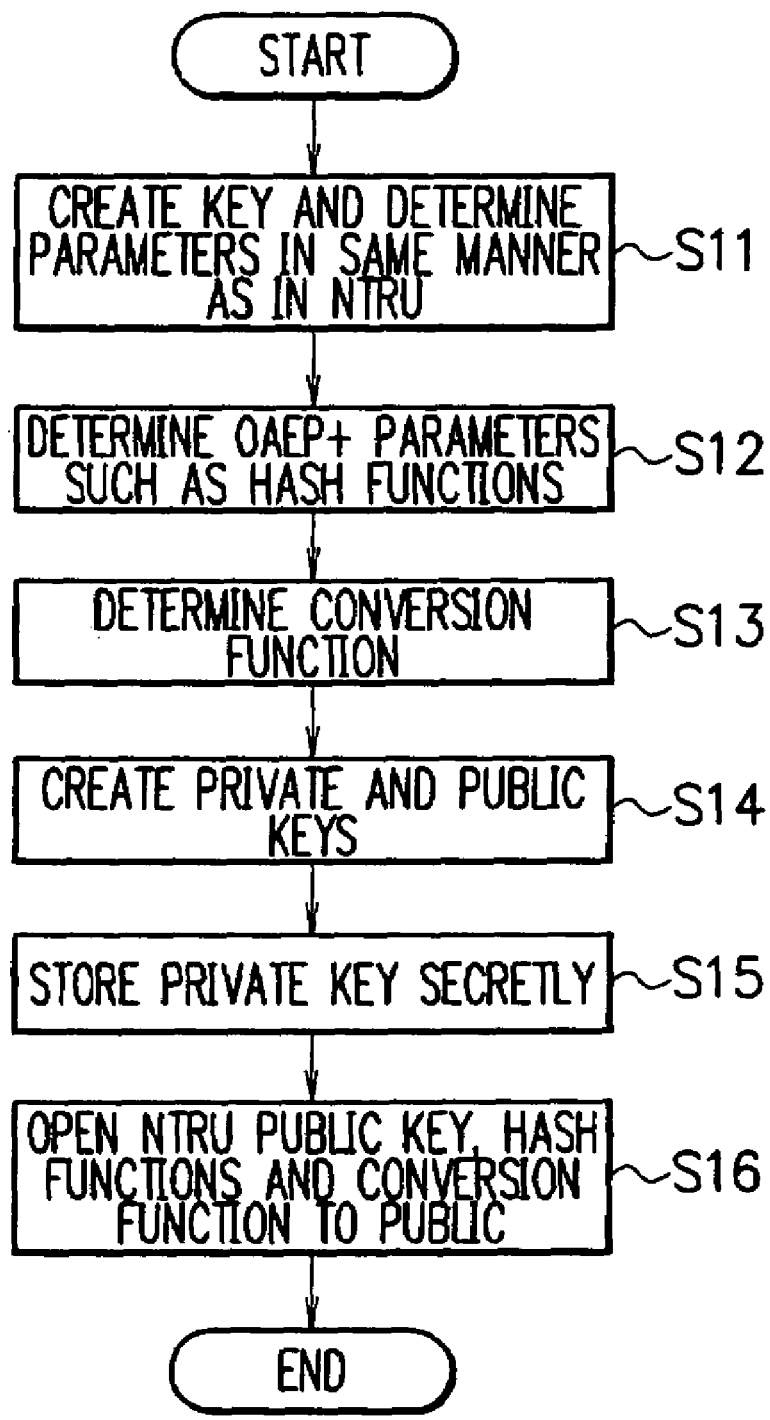
FIG. 4 is a flowchart showing the key creation process according to the first embodiment.
Figure 5:
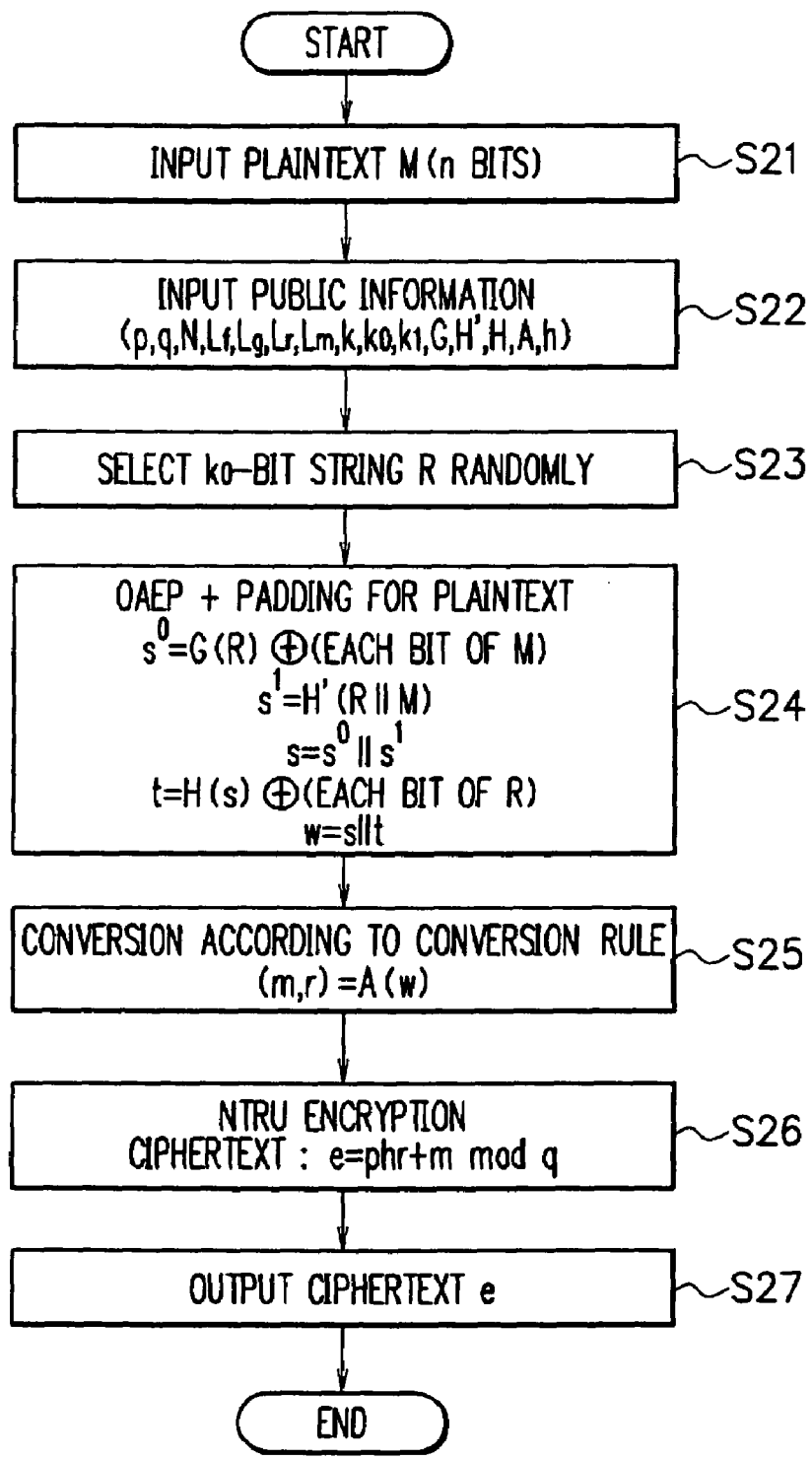
FIG. 5 is a flowchart showing the encryption process according to the first embodiment.
Figure 7:
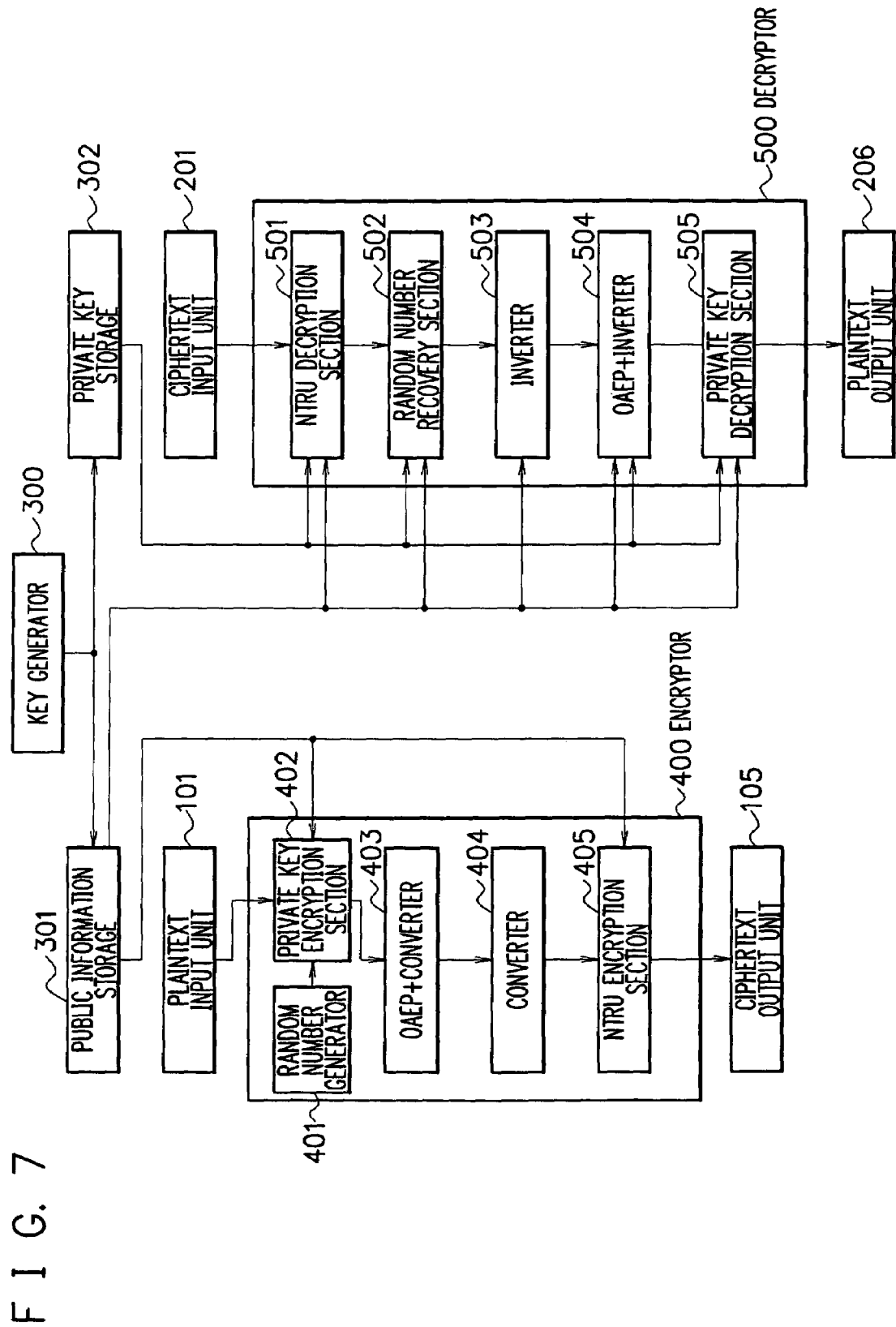
FIG. 7 is a functional block diagram showing the construction of an encryptor/decryptor according to the second embodiment of the present invention.
Figure 8:
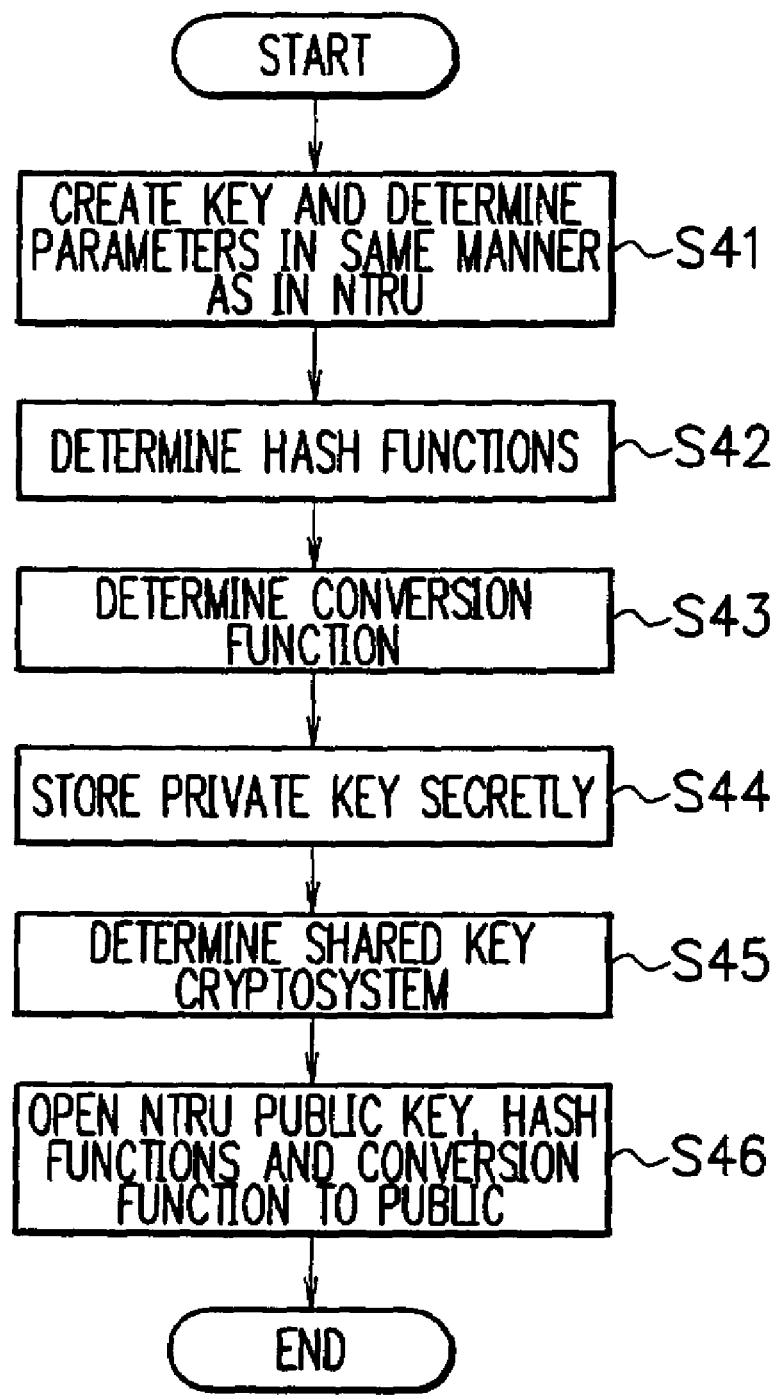
FIG. 8 is a flowchart showing the key creation process according to the second embodiment.
Figure 9:
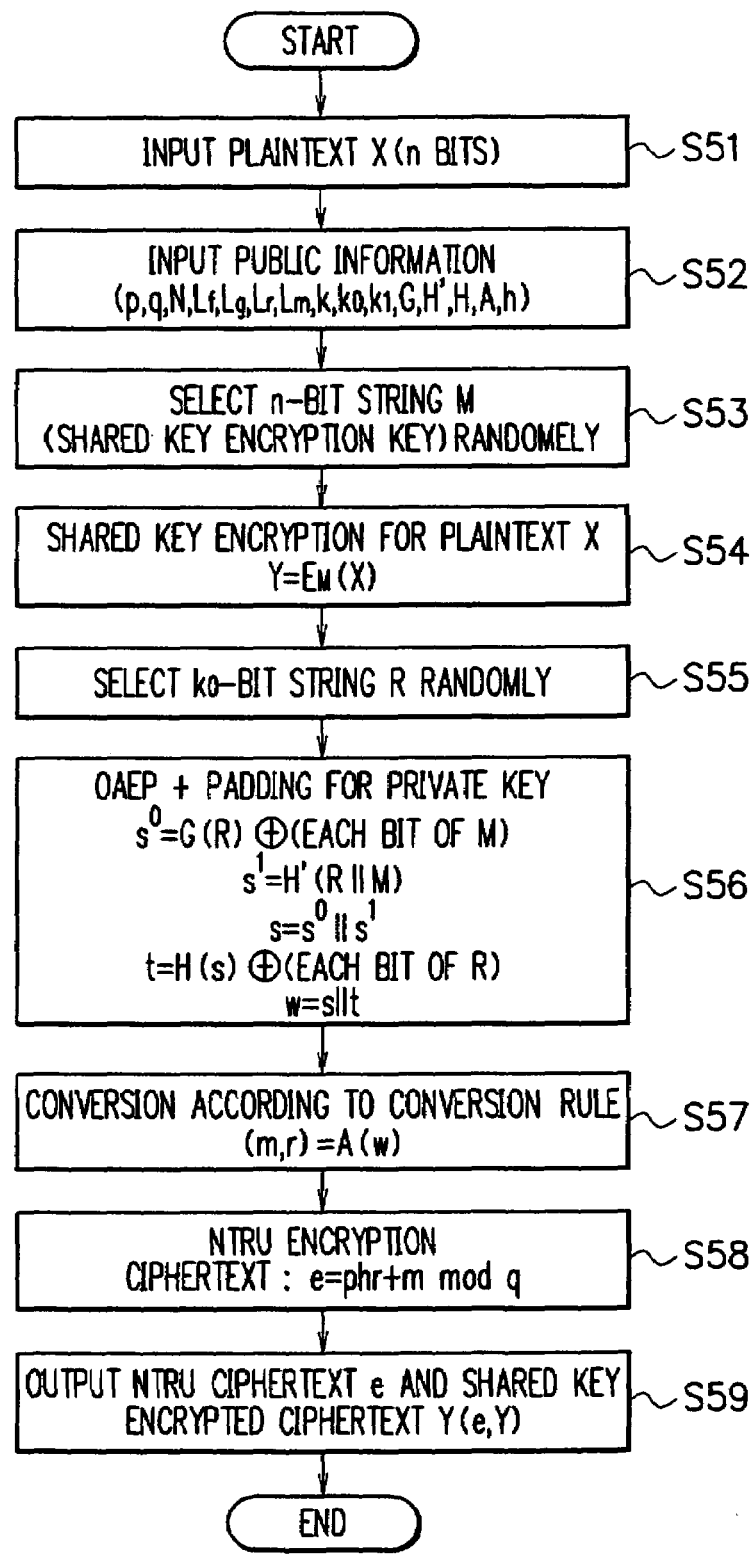
FIG. 9 is a flowchart showing the encryption process according to the second embodiment.
Figure 10:
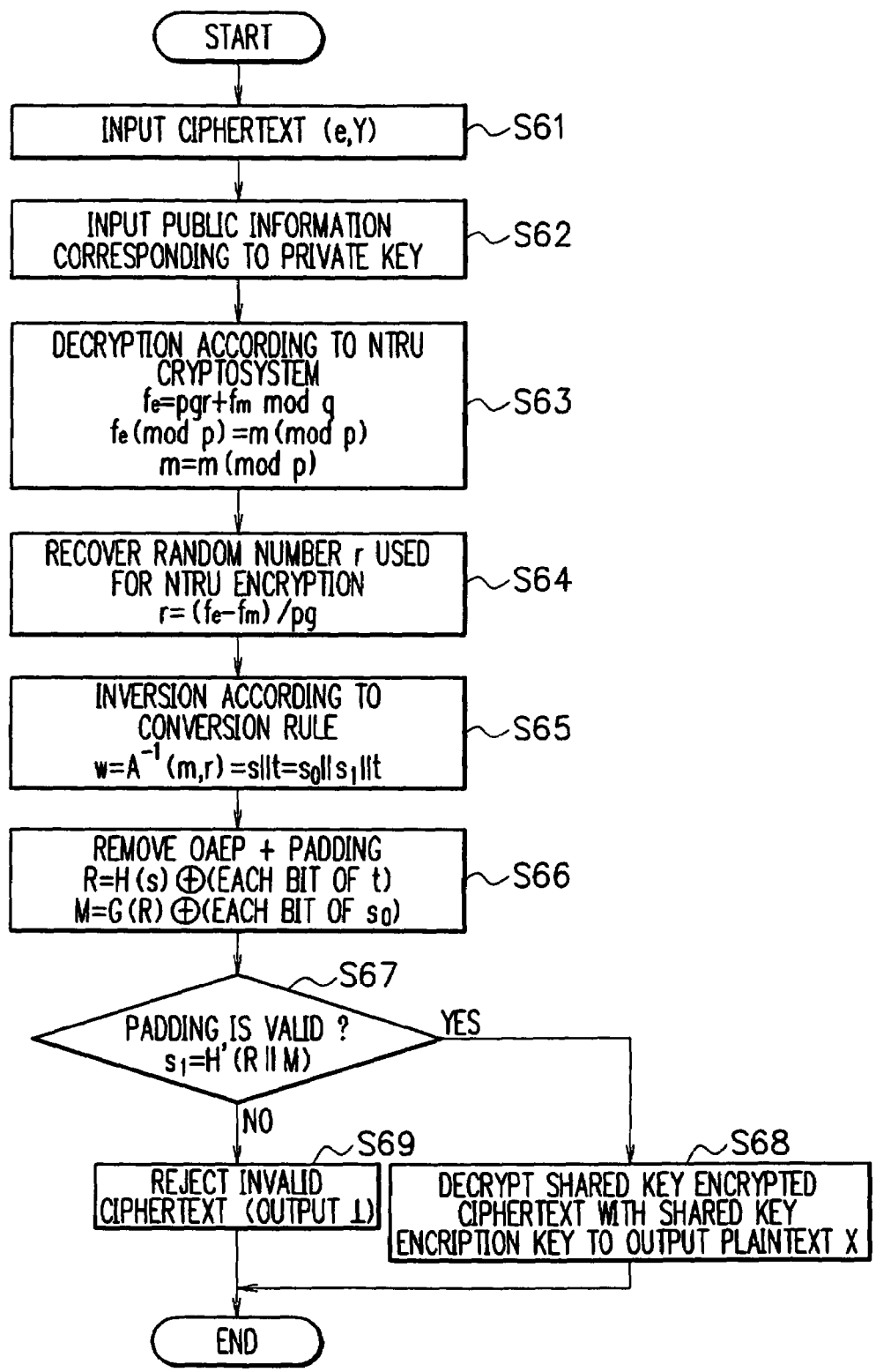
FIG. 10 is a flowchart showing the decryption process according to the second embodiment.

100 Encryptor
101 Plaintext input unit
102 OAEP+ converter
103 Conversion function A-based converter
104 NTRU encryption section
105 Ciphertext output unit
200 Decryptor
201 Ciphertext input unit
202 NTRU decryption section
203 Random number recovery section
204 Conversion function A-based inverter
205 OAEP+ inverter
206 Plaintext output unit
300 Key generator
301 Public information storage
302 Private key storage

The invention claimed is:

1. A padding application method for applying a padding scheme that ensures the security of cryptosystems not using random numbers, to cryptosystems in which a random number is used to create a ciphertext and is susceptible to recovery at a receiving end, the method comprising the steps of:
   converting input information into a bit string with a prescribed length or less according to the padding scheme;
   converting the bit string into a first bit string and a second bit string based on a prescribed conversion rule; and
   supplying an encryption function with the first bit string as data input and the second bit string as random number input;
   wherein the prescribed conversion rule is a map to map the bit string having a prescribed length or less to the element of the direct product of the set of the first bit strings and the set of the second bit strings, and satisfies the following conditions: the map is injective; the map and inverse map thereof are computable by a polynomial time; and the encryption function whose domain is the direct product is a one-way function.

2. The padding application method claimed in claim 1, wherein the conversion rule is a rule to divide the bit string into two parts in such a manner as to set the first half of the bit string as the first bit string and the second half of the bit string as the second bit string.

3. The padding application method claimed in claim 1 or 2, wherein the OAEP+ padding is employed as the padding scheme, and the NTRU cryptosystem is employed as the cryptosystem using random numbers.

4. A padder used in a padding application method for applying a padding scheme that ensures the security of cryptosystems not using random numbers, to cryptosystems in which a random number is used to create a ciphertext and is susceptible to recovery at a receiving end, the padder comprising:
   a conversion means for converting input information into a bit string with a prescribed length or less according to the padding scheme;
   a bit string conversion means for converting the bit string into a first bit string and a second bit string based on a prescribed conversion rule; and
   an encryption means for supplying an encryption function with the first bit string as data input and the second bit string as random number input to create a ciphertext;
   wherein the prescribed conversion rule is a map to map the bit string having a prescribed length or less to the element of the direct product of the set of the first bit strings and the set of the second bit strings, and satisfies the following conditions: the map is injective; the map and inverse map thereof are computable by a polynomial time; and the encryption function whose domain is the direct product is a one-way function.

5. The padder claimed in claim 4, wherein the conversion rule is a rule to divide the bit string into two parts in such a manner as to set the first half of the bit string as the first bit string and the second half of the bit string as the second bit string.

6. The padder claimed in claim 4 or 5, wherein the OAEP+ padding is employed as the padding scheme, and the NTRU cryptosystem is employed as the cryptosystem using random numbers.

7. An encryptor for creating a ciphertext by applying a padding scheme that ensures the security of cryptosystems not using random numbers, to a cryptosystem in which a random number is used to create a ciphertext and is susceptible to recovery at a receiving end, the encryptor comprising:
   a padding conversion means for converting an input plaintext into a bit string with a prescribed length or less according to the padding scheme;
   a bit string conversion means for converting the bit string into a first bit string and a second bit string based on a prescribed conversion rule; and
   an encryption means for supplying an encryption function with the first bit string as data input and the second bit string as random number input to create a ciphertext;
   wherein the prescribed conversion rule is a map to map the bit string having a prescribed length or less to the element of the direct product of the set of the first bit strings and the set of the second bit strings, and satisfies the following conditions: the map is injective; the map and inverse map thereof are computable by a polynomial time; and the encryption function whose domain is the direct product is a one-way function.

8. An encryptor for creating a ciphertext by applying a padding scheme that ensures the security of cryptosystems not using random numbers, to a cryptosystem in which a random number is used to create a ciphertext and is susceptible to recovery at a receiving end, the encryptor comprising:
   a first encryption means for randomly selecting a private key encryption key, and performs private key encryption for an input plaintext using the private key encryption key to create a first ciphertext;
   a padding conversion means for converting the private key encryption key into a bit string with a prescribed length or less according to the padding scheme;
   a bit string conversion means for converting the bit string into a first bit string and a second bit string based on a prescribed conversion rule;
   a second encryption means for supplying an encryption function with the first bit string as data input and the second bit string as random number input to create a second ciphertext; and
   a ciphertext output means for outputting the first ciphertext and the second ciphertext as a ciphertext;
   wherein the prescribed conversion rule is a map to map the bit string having a prescribed length or less to the element of the direct product of the set of the first bit strings and the set of the second bit strings, and satisfies the following conditions: the map is injective; the map and inverse map thereof are computable by a polynomial time; and the encryption function whose domain is the direct product is a one-way function.

9. The encryptor claimed in claim 7 or 8, wherein the conversion rule is a rule to divide the bit string into two parts in such a manner as to set the first half of the bit string as the first bit string and the second half of the bit string as the second bit string.

10. The encryptor claimed in claim 7 or 8, wherein the OAEP+ padding is employed as the padding scheme, and the NTRU cryptosystem is employed as the cryptosystem using random numbers.

11. An encryption method for creating a ciphertext by applying a padding scheme that ensures the security of cryptosystems not using random numbers, to a cryptosystem in which a random number is used to create a ciphertext and is susceptible to recovery at a receiving end, the method comprising the steps of:
   converting an input plaintext into a bit string with a prescribed length or less according to the padding scheme;
   converting the bit string into a first bit string and a second bit string based on a prescribed conversion rule; and
   supplying an encryption function with the first bit string as data input and the second bit string as random number input to create a ciphertext;
   wherein the prescribed conversion rule is a map to map the bit string having a prescribed length or less to the element of the direct product of the set of the first bit strings and the set of the second bit strings, and satisfies the following conditions: the map is injective; the map and inverse map thereof are computable by a polynomial time; and the encryption function whose domain is the direct product is a one-way function.

12. An encryption method for creating a ciphertext by applying a padding scheme that ensures the security of cryptosystems not using random numbers, to a cryptosystem in which a random number is used to create a ciphertext and is susceptible to recovery at a receiving end, the method comprising the steps of:
   randomly selecting a private key encryption key;
   performing private key encryption for an input plaintext using the private key encryption key to create a first ciphertext;
   converting the private key encryption key into a bit string with a prescribed length or less according to the padding scheme;
   converting the bit string into a first bit string and a second bit string based on a prescribed conversion rule;
   supplying an encryption function with the first bit string as data input and the second bit string as random number input to create a second ciphertext; and
   outputting the first ciphertext and the second ciphertext as a ciphertext;
   wherein the prescribed conversion rule is a map to map the bit string having a prescribed length or less to the element of the direct product of the set of the first bit strings and the set of the second bit strings, and satisfies the following conditions: the map is injective; the map and inverse map thereof are computable by a polynomial time; and the encryption function whose domain is the direct product is a one-way function.

13. The encryption method claimed in claim 11 or 12, wherein the conversion rule is a rule to divide the bit string into two parts in such a manner as to set the first half of the bit string as the first bit string and the second half of the bit string as the second bit string.

14. The encryption method claimed in claim 11 or 12, wherein the OAEP+ padding is employed as the padding scheme, and the NTRU cryptosystem is employed as the cryptosystem using random numbers.

15. A decryptor for decrypting a ciphertext created by the encryptor claimed in claim 7, comprising:
   a first decryption means for decrypting an input ciphertext to generate a first bit string according to a decryption scheme corresponding to the cryptosystem using random numbers;
   a random number recovery means for recovering a random number used for encryption as a second bit string;
   a bit string inversion means for inverting the first bit string and the second bit string to a bit string with a prescribed length or less based on the inverse of the conversion rule;
   a padding inversion means for removing padding according to the padding scheme from the bit string with a prescribed length or less to retrieve the original plaintext; and
   a determination means for verifying the validity of the padding, and if the padding is valid, outputting the plaintext.

16. A decryptor for decrypting a ciphertext created by the encryptor claimed in claim 8, comprising:
   a first decryption means for decrypting the second ciphertext to generate a first bit string according to a decryption scheme corresponding to the cryptosystem using random numbers;
   a random number recovery means for recovering a random number used for encryption as a second bit string;

a bit string inversion means for inverting the first bit string and the second bit string to a bit string with a prescribed length or less based on the inverse of the conversion rule;

a padding inversion means for removing padding according to the padding scheme from the bit string with a prescribed length or less to retrieve the original private key encryption key; and a second decryption means for verifying the validity of the padding, and if the padding is valid, decrypting the first ciphertext using the private key encryption key.

17. A decryption method for decrypting a ciphertext created according to the encryption method claimed in claim 11, comprising the steps of:

decrypting an input ciphertext to generate a first bit string according to a decryption scheme corresponding to the cryptosystem using random numbers;

recovering a random number used for encryption as a second bit string;

inverting the first bit string and the second bit string to a bit string with a prescribed length or less based on the inverse of the conversion rule;

removing padding according to the padding scheme from the bit string with a prescribed length or less to retrieve the original plaintext; and verifying the validity of the padding, and if the padding is valid, outputting the plaintext.

18. A decryption method for decrypting a ciphertext created according to the encryption method claimed in claim 12, comprising the steps of:

decrypting the second ciphertext to generate a first bit string according to a decryption scheme corresponding to the cryptosystem using random numbers;

recovering a random number used for encryption as a second bit string;

inverting the first bit string and the second bit string to a bit string with a prescribed length or less based on the inverse of the conversion rule;

removing padding according to the padding scheme from the bit string with a prescribed length or less to retrieve the original private key encryption key; and verifying the validity of the padding, and if the padding is valid, decrypting the first ciphertext using the private key encryption key.

19. A cryptographic communication system comprising communication terminals that perform cryptographic communication through a communication network using a padding scheme that ensures the security of cryptosystems not using random numbers with a cryptosystem in which a random number is used to create a ciphertext and is susceptible to recovery at a receiving end, wherein:

a sending communication terminal includes:

a padding conversion means for converting an input plaintext into a bit string with a prescribed length or less according to the padding scheme;

a bit string conversion means for converting the bit string into a first bit string and a second bit string based on a prescribed conversion rule, the conversion rule being a map to map the bit string having a prescribed length or less to the element of the direct product of the set of the first bit strings and the set of the second bit strings and satisfying the following conditions: the map is injective; the map and inverse map thereof are computable by a polynomial time; and the encryption function whose domain is the direct product is a one-way function;

an encryption means for supplying an encryption function with the first bit string as data input and the second bit string as random number input to create a ciphertext; and a transmission means for transmitting the ciphertext to a receiving terminal; and the receiving communication terminal includes:

a reception means for receiving the ciphertext from the sending communication terminal;

a first decryption means for decrypting the received ciphertext to generate a first bit string according to a decryption scheme corresponding to the cryptosystem using random numbers;

a random number recovery means for recovering a random number used for the encryption as a second bit string;

a bit string inversion means for inverting the first bit string and the second bit string to a bit string with a prescribed length or less based on the inverse of the conversion rule;

a padding inversion means for removing padding according to the padding scheme from the bit string with a prescribed length or less to retrieve the original plaintext; and a determination means for verifying the validity of the padding, and if the padding is valid, outputting the plaintext.

20. A cryptographic communication system comprising communication terminals that perform cryptographic communication through a communication network using a padding scheme that ensures the security of cryptosystems not using random numbers, with a cryptosystem in which a random number is used to create a ciphertext and is susceptible to recovery at a receiving end, wherein:

a sending communication terminal includes:

a first encryption means for randomly selecting a private key encryption key, and performs private key encryption for an input plaintext using the private key encryption key to create a first ciphertext;

a padding conversion means for converting the private key encryption key into a bit string with a prescribed length or less according to the padding scheme;

a bit string conversion means for converting the bit string into a first bit string and a second bit string based on a prescribed conversion rule, the conversion rule being a map to map the bit string having a prescribed length or less to the element of the direct product of the set of the first bit strings and the set of the second bit strings and satisfying the following conditions: the map is injective; the map and inverse map thereof are computable by a polynomial time; and the encryption function whose domain is the direct product is a one-way function;

a second encryption means for supplying an encryption function with the first bit string as data input and the second bit string as random number input to create a second ciphertext; and a ciphertext output means for outputting the first ciphertext and the second ciphertext as a ciphertext; and a receiving communication terminal includes:

a reception means for receiving the ciphertext from the sending communication terminal;

a first decryption means for decrypting the second ciphertext to generate a first bit string according to a decryption scheme corresponding to the cryptosystem using random numbers;

a random number recovery means for recovering a random number used for the encryption as a second bit string;

a bit string inversion means for inverting the first bit string and the second bit string to a bit string with a prescribed length or less based on the inverse of the conversion rule;

a padding inversion means for removing padding according to the padding scheme from the bit string with a prescribed length or less to retrieve the original private key encryption key; and a second decryption means for verifying the validity of the padding, and if the padding is valid, decrypting the first ciphertext using the private key encryption key.

\* \* \* \* \*